United States Patent [19]
Matsuda et al.

[11] Patent Number: 5,671,197
[45] Date of Patent: Sep. 23, 1997

[54] MINIATURE MAGNETIC DISK DEVICE AND VOICE COIL ACTUATOR THEREOF

[75] Inventors: Yasuhiro Matsuda; Takashi Yoshida, both of Ibaraki-ken; Isao Shimizu, Ishioka; Takashi Kohno, Ibaraki-ken, all of Japan

[73] Assignee: Hitachi, Ltd., Tokyo, Japan

[21] Appl. No.: 766,045

[22] Filed: Dec. 16, 1996

Related U.S. Application Data

[63] Continuation of Ser. No. 481,834, Jun. 7, 1995, abandoned.

[30] Foreign Application Priority Data

Jun. 16, 1994 [JP] Japan .................. 6-134123

[51] Int. Cl.$^6$ ............................................ G11B 7/00
[52] U.S. Cl. ................................ 369/32; 369/75
[58] Field of Search ....................... 369/44.28, 44.32, 369/54, 32, 58, 48, 44.14, 44.15; 360/69, 75, 97.1, 73.03

[56] References Cited

U.S. PATENT DOCUMENTS

| | | | |
|---|---|---|---|
| 5,204,593 | 4/1993 | Ueki | 360/73.03 |
| 5,257,255 | 10/1993 | Morimoto et al. | 369/53 |
| 5,264,975 | 11/1993 | Bajorek et al. | 360/97.01 |
| 5,325,252 | 6/1994 | Yagi et al. | 360/97.01 |
| 5,375,021 | 12/1994 | Boeckner | 360/97.01 |
| 5,384,524 | 1/1995 | Romano | 369/43 |
| 5,402,200 | 3/1995 | Shrinkle et al. | 360/69 |
| 5,412,809 | 5/1995 | Tam et al. | 360/75 |

FOREIGN PATENT DOCUMENTS

5-65957  9/1993  Japan .

*Primary Examiner*—Nabil Hindi
*Attorney, Agent, or Firm*—Evenson, McKeown, Edwards & Lenahan, P.L.L.C.

[57] ABSTRACT

A miniature magnetic disk device or a miniature optical disk device has a recording disk having a diameter less than or equal to 0.7 inches. The disk device also includes a spindle motor which rotates the recording disk, a read/write head for recording or reproducing information on and from the recording disk, a support member which holds the read/write head, and a support shaft which is coupled to the support member. A voice coil motor, which is coupled to the support member and the support shaft, sets the read/write head in a desired position over the disk. A resistor which has a value of at least 2.5Ω is connected in series with a coil of the voice coil motor, and the resistor makes it possible to reduce power consumption of the voice coil motor. The resistor may be a variable resistor, and a conductor of the coil may have a cross-sectional area less than $2.55\times10^{-3}$ mm$^2$. A ratio h/t of a thickness h of the coil to a thickness t of a magnetic circuit of the voice coil motor have be at least 0.25. Moreover, by mounting several of these disks on a board which is standardized as PCMCIA type 3, a miniature array disk device is formed.

22 Claims, 6 Drawing Sheets

MINIATURE MAGNETIC DISK DEVICE AND VOICE COIL ACTUATOR THEREOF

This application is a continuation of application Ser. No. 08/481,834, filed on Jun. 7, 1995 now abandoned.

BACKGROUND OF THE INVENTION

This invention relates to a miniature disk device and a voice coil actuator and, more particularly, to a miniature disk device and voice coil actuator used for a recorder or a reproducer having a disk size of 0.7 inch (about 17 mm) or smaller in diameter.

In a small disk device, it is required that a magnetic head quickly move between information tracks so as to increase the information transfer rate. In order to meet these requirements, a conventional small magnetic disk device is designed to provide an increased driving force to a voice coil motor for moving the magnetic head. In practice, the thickness of a magnet and yokes in a magnetic circuit are maximized to increase their magnetic flux density.

Another way to increase the information transfer rate is to use an array disk in which a plurality of small magnetic disk devices are operated in parallel. When an array disk is used, data can be transferred in parallel and thus the overall transfer rate is equal to the transfer rate of one disk multiplied by the number of disks. Hence, the transfer rate is very high even if the rates of the individual disks are low. Examples of such array disks are disclosed in Japanese Patent Publication No. 65957/1993 and U.S. application Ser. No. 08/404,424, filed on Mar. 18, 1995, the specifications of which are both incorporated by reference herein. In these prior art references, an electronic circuit, such as a spindle motor driving circuit, is formed directly on a multilayer ceramic substrate. These references further disclose a smaller magnetic disk device having a substrate. A spindle motor with a one-inch magnetic disk and a part of a voice coil motor are provided on the substrate. An example with eight such magnetic disk devices mounted on the substrate is also disclosed.

An array disk, in which a plurality of miniature magnetic disk devices using one-inch or smaller magnetic disks that are operated in parallel, provides an effective means for carrying out a high-speed transfer operation. However, it is a disadvantage of such array disks that the power consumption increases.

In a miniature disk device using a one-inch or smaller magnetic disk, the moving parts of the magnetic head have less mass. This allows the magnetic head to move faster. However, since the volume of the voice coil motor decreases in a miniature disk device, the resistance value of a coil in the voice coil motor also decreases, so that more current flows through the coil. Accordingly, the amount of electric power consumed by the voice coil motor tends to increase. Namely, the power source voltage for driving the magnetic disk device decreases in accordance with the miniaturization of the device, but the power consumption increases in proportion to the square of the current value. Thus, it has been difficult to attain a reduction in the power consumption of such miniaturized disk devices.

SUMMARY OF THE INVENTION

There is therefore needed a miniature magnetic or optical disk device having a voice coil motor with a reduced power consumption, while still increasing the moving speed of the recording head.

These needs are met by the miniature disk device according to the present invention which includes an information recording magnetic or optical disk having a diameter of 0.7 inches or smaller, a read/write head for recording or reproducing information on and from the disk, a voice coil motor for turning a head support member so as to set the read/write head in an arbitrary desired position in the radial direction of the disk, a control circuit board having a voice coil motor driving circuit thereon, and a current reduction device for reducing the current flowing in the coil of the voice coil motor.

This miniature disk device according to the present invention preferably includes at least one magnetic disk having a diameter of 0.7 inch or smaller, a spindle motor adapted to hold the at least one magnetic disk and rotate the same, a magnetic head adapted to record or reproduce information on or from the magnetic disk, a support member adapted to hold the magnetic head, a support shaft for pivotably supporting the support member, a voice coil motor adapted to turn the support member for the purpose of setting the magnetic head in an arbitrary position in the radial direction of the magnetic disk, a base for supporting the support shaft and spindle motor thereon, a cover for housing the magnetic disk retained by the spindle motor, the support member, the support shaft and the voice coil motor, a control circuit board having a driving circuit for the spindle motor and voice coil motor, and a resistor of at least $2.5\Omega$ which is connected in series with the coil of the voice coil motor. The resistor may be variable and may be provided on the control circuit board.

It is an advantage of the present invention that the ratio (h/t) of the thickness h of the coil of the voice coil motor to the thickness t of the magnetic circuit is preferably at least 0.25. It is further preferable to reduce the cross-sectional area per conductor of the coil of the voice coil motor to $2.55 \times 10^{-3}$ mm$^2$ or smaller. The power source voltage for driving the voice coil motor may be set to lower than 3.3 V in order to decrease the current value in the coil of the voice coil motor, thus resulting in low power consumption.

It is especially advantageous to provide a resistor having a large resistance value connected in series with the coil on the voice coil motor so that a total resistance value for the circuit becomes large. Accordingly, the current value can be reduced while maintaining the high-speed movement of the magnetic head without causing the magnetic flux density to decrease.

It is a further advantage of the present invention that since the construction of the invention is relatively simple, the manufacturing of the disk device can be easily done, and a reduction of both the power consumption and manufacturing cost can be attained. Since the thickness of the magnet and yoke on the magnetic circuit for the voice coil motor is reduced, the volume of the coil increases, and the resistance value of the coil thus becomes large. Because of this, a reduction of the power consumption based on the decrease in the current value is attained. Moreover, since the resistance value per unit length of the coil is increased by reducing the thickness of the wire material, the number of turns of the coil can be increased in order to increase the resistance value of the coil. The same operational effect can also be obtained when the power source voltage for driving the voice coil motor is lower than 3.3 V. When these techniques are suitably combined, a further reduction in the power consumption becomes possible due to a synergistic effect.

Other objects, advantages and novel features of the present invention will become apparent from the following detailed description of the invention when considered in conjunction with the accompanying drawings.

DETAILED DESCRIPTION OF THE DRAWINGS

Figure 1:
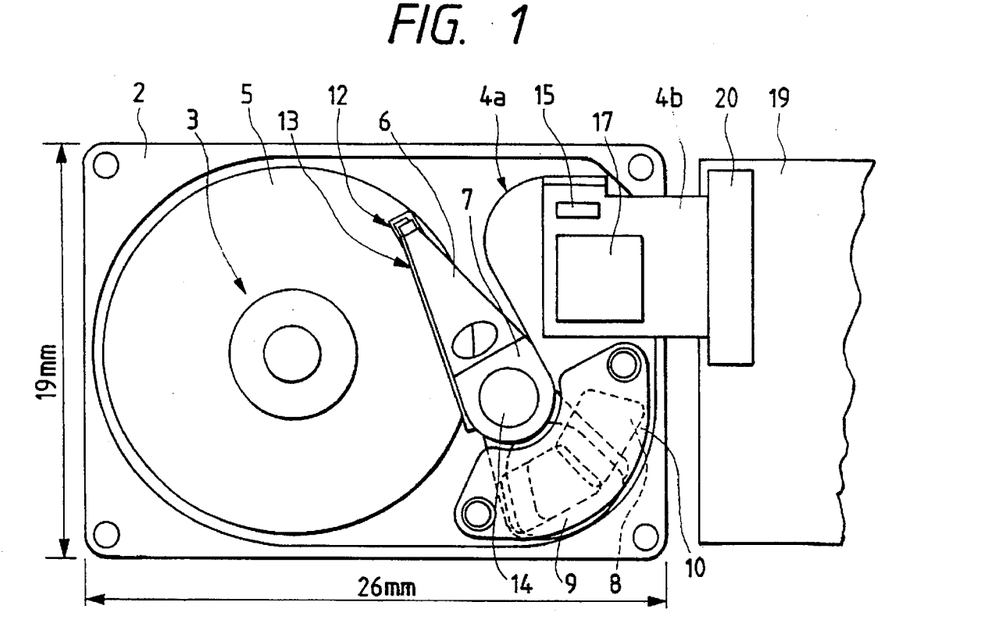
FIG. 1 is a plan view of an embodiment of the present invention using a resistor.
Figure 2:
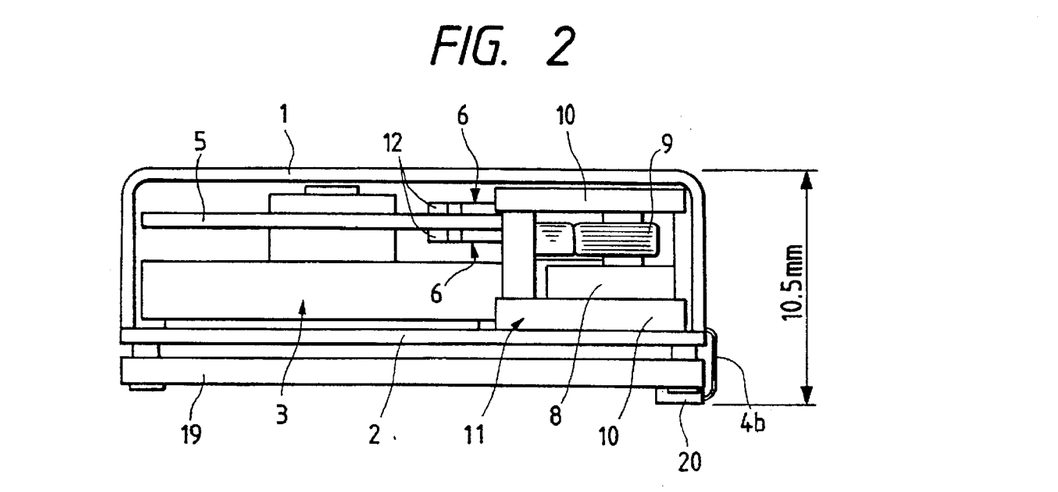
FIG. 2 is a side elevation of the embodiment shown in FIG. 1 with the circuit board and connector folded below the base.

An embodiment of the present invention will now be described with reference to the figures. FIG. 1 is a plan view of a miniature magnetic disk device, and FIG. 2 is a side elevation view of the embodiment shown in FIG. 1, wherein the circuit board 19 and connector 20 are disposed below the base 2. Referring to these drawings, a spindle motor 3, being rotatable at a predetermined speed, is fixed on a base 2. A magnetic disk 5 is fixed to the spindle motor 3. A support shaft 14 is arranged on the base 2 in close proximity to the magnetic disk 5 held on the spindle motor 3. The support shaft 14 is parallel to the shaft of the spindle motor 3. A load arm 6, holding a magnetic head 12 and a carriage 7, is fixedly mounted on the support shaft 14 so that the load arm 6 and carriage 7 can be pivotally turned.

A coil 9, forming part of a voice coil motor, is fixed to an end portion of the carriage 7. A magnetic circuit 11, which forms another structural element of the voice coil motor, is provided with a yoke 10 fixed on the base 2, and a magnet 8 fixed on the yoke 10. A flexible printed circuit (FPC) 4a is fixed at one end thereof to the carriage 7, and at the other end thereof to the base 2. This flexible printed circuit 4a is connected via a second FPC 4b to a control circuit board 19. The control circuit board 19 is shown in FIG. 1 provided on the outer side of the magnetic disk device, and in FIG. 2 provided under the base 2 of the magnetic disk device. The circuit board 19 has a circuit for driving the spindle motor 3 and the voice coil motor. The FPC 4b is provided with a read/write integrated circuit (IC) 17. The head signal lines 13 from the magnetic head 12 are electrically connected to the read/write IC 17 via the FPC 4a, and to the control circuit board 19 via a connector 20. An end portion of the coil 9 is also electrically connected to the FPC 4a, and to the control circuit board 19. The control circuit board 19 can be fixed to a lower side of the base 2 as shown in FIG. 2.

The magnetic disk 5 which is fixedly mounted on the spindle motor 3, the carriage 7 supported on the support shaft 14, the load arm 6 fixed to the carriage 7, the magnetic head 12 held on the load arm 6, the magnetic circuit 11, the coil 9, the signal lines 13 of the magnetic head 12, and the FPC 4a, are all housed within a space sealed by a cover 1 and the base 2 through the use of screws.

The direction and magnitude of the turning torque acting on the carriage 7 are controlled by controlling the direction and time of application of a current to the coil 9 which is fixed to the carriage 7. The voice coil motor thereby sets the magnetic head 12 on a desired position on the magnetic disk 5. The voice coil motor, carriage 7, load arm 6, magnetic head 12 and support shaft 14 constitute a voice coil actuator.

The miniature magnetic disk device operates with a magnetic disk 5 having a diameter of 0.7 inch (about 17 mm). The miniature disk device itself has a width of about 19 mm, a length of about 26 mm, and a height of about 10.5 mm.

In such a miniature disk device, the resistance value of the coil 9 cannot be very large. In the embodiment shown in FIGS. 1 and 2, the resistance value of the coil 9 is about 19Ω, and the diameter of a conductor portion of a copper wire forming the coil is 0.06 mm, with the number of turns in the coil being about 260. These values are nearly limit levels in view of the capacity of the coil 9.

A resistor 15 is provided on the FPC 4b, and is connected in series with the coil 9 via the FPC 4a, and then to the voice coil motor driving circuit on the control circuit board 19. The resistance value of the resistor 15 is about 2.5Ω, and thus a total resistance value about 21.5Ω is provided for the resistor 15 and coil 9.

When the power source voltage for driving the voice coil motor is 3.3 V, the power consumption of the motor is thus 0.5 W. This value equals the power consumption for the best data obtained on conventional small disk devices. Accordingly, if the resistance value of the resistor 15 is higher than 2.5Ω, the power consumption of the voice coil motor further decreases. It is readily understood that the resistor 15 could also be provided on the control circuit board 19.

The difficulty associated with increasing the resistance of the coil also occurs in an optical disk device. When the means according to the present invention is used, even for an optical disk device, the power consumption of a voice coil motor can be reduced.

Figure 3:
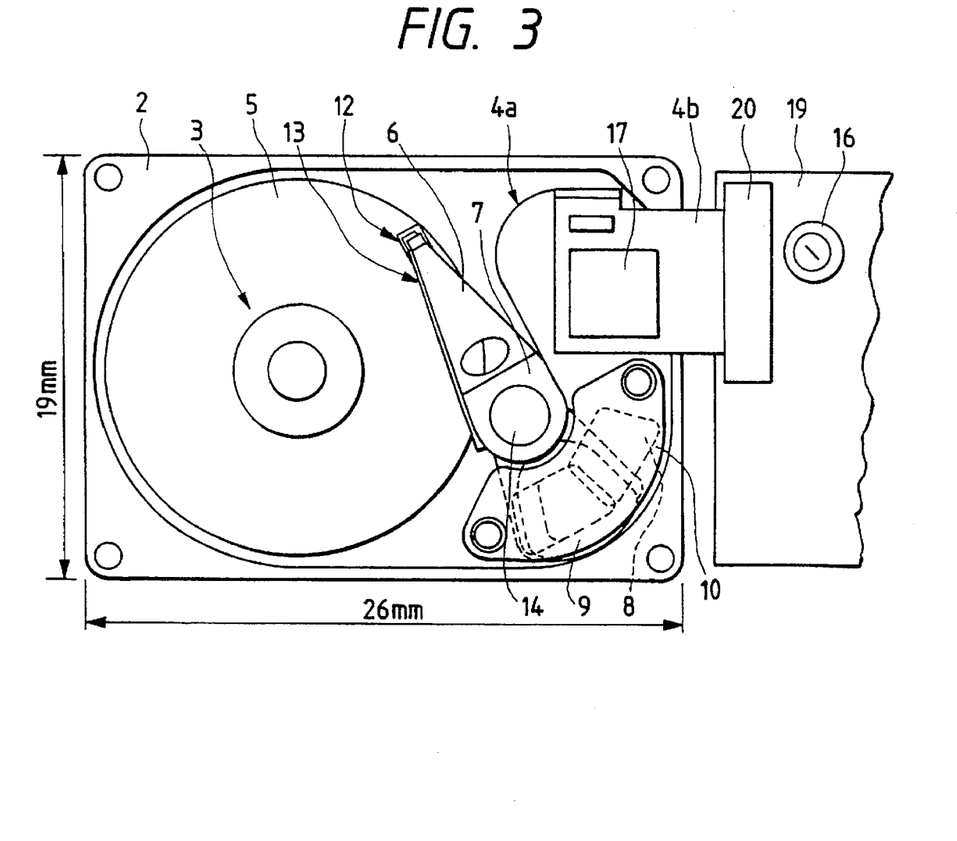
FIG. 3 is a plan view of a further embodiment of the present invention using a variable resistor.
Figure 8:
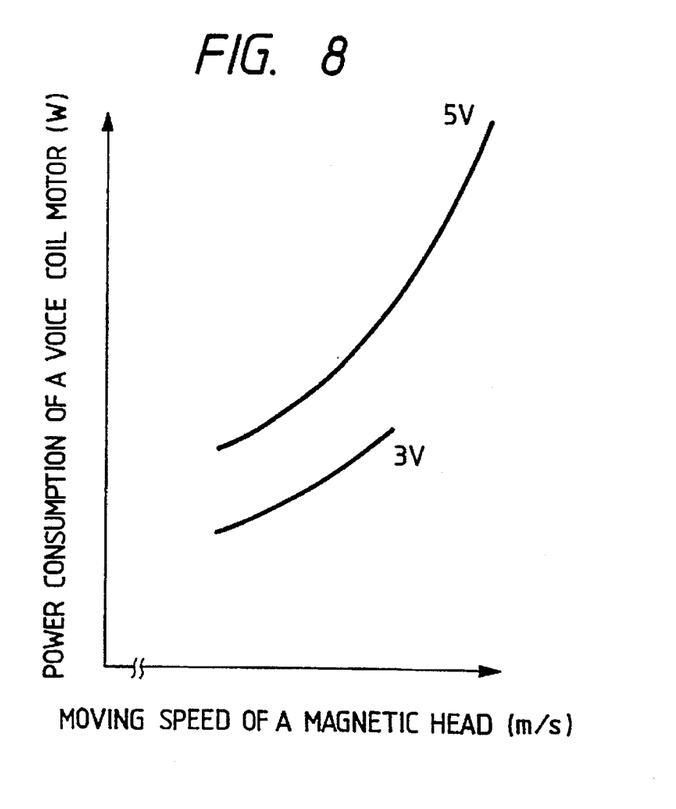
FIG. 8 is a diagram illustrating the moving speed of a magnetic head in the magnetic disk device and the power consumption of a voice coil motor therein.

FIG. 3 shows a further embodiment of the present invention. In this embodiment, a variable resistor 16 is used instead of the resistor 15 in the embodiment of FIG. 1. The variable resistor 16 is provided on the control circuit board 19. The correlation between the moving speed of magnetic head 12 of a magnetic disk device and the power consumption of a voice coil motor is shown in the diagram of FIG. 8. Accordingly, when the resistance value of the variable resistor 16 is varied, the moving speed of the magnetic head 12 and the power consumption of the voice coil motor can be regulated, and thus the desired power consumption can be obtained.

Figure 4:
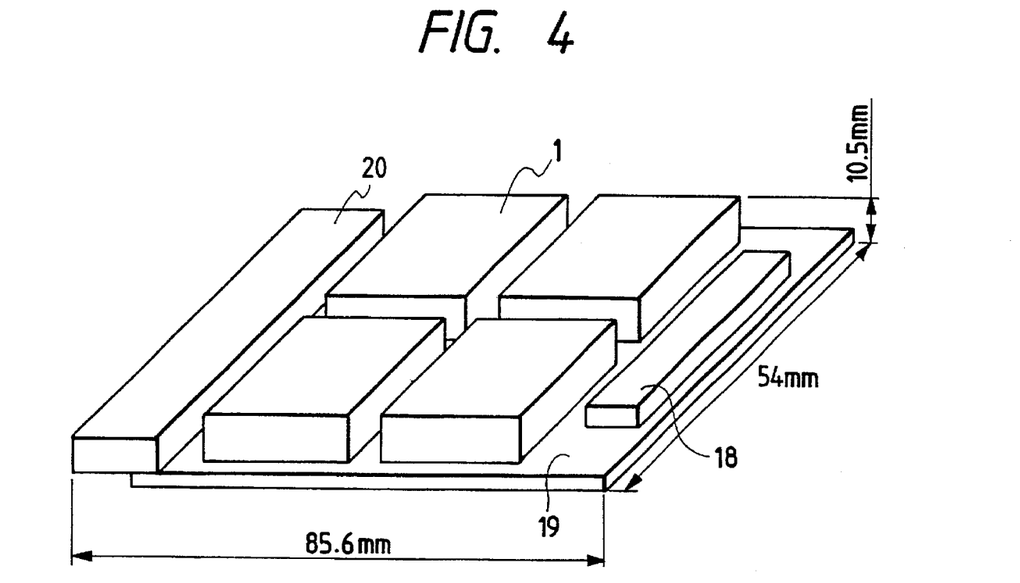
FIG. 4 is a perspective view of another embodiment of the present invention showing an array disk.

FIG. 4 shows another embodiment of the present invention. This embodiment is an example of an array disk including four magnetic disk devices 1 that are each identical to the magnetic disk device shown in FIG. 1. A driving circuit for a spindle motor and a voice coil motor is included in an integrated circuit 18. This disk array has overall dimensions of a width of about 54 mm, a length of about 85.6 mm and a height of about 10.5 mm. The disk array corresponds to a type 3 card slot according to the standards of the Personal Computer Memory Card International Association (PCMCIA). Since the power consumption per magnetic disk is reduced, the movement of the head becomes slow, but the required transfer speed of the device as a whole can be secured by a parallel operation of the array.

Figure 5:
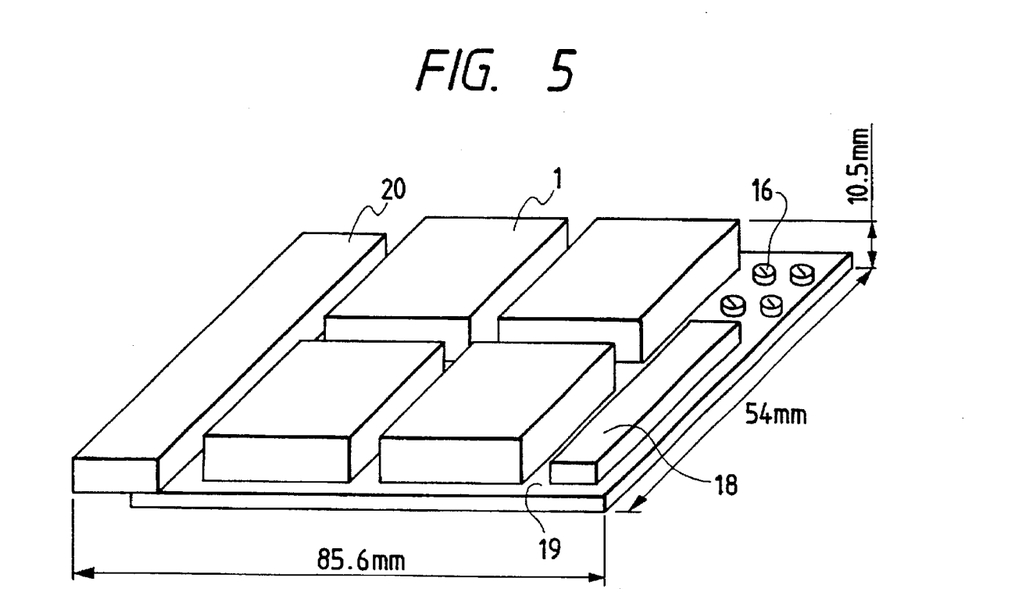
FIG. 5 is a perspective view of a further embodiment of the present invention shown in FIG. 4.

FIG. 5 shows a modified example of the embodiment shown in FIG. 4. This modified example is of an array disk including four magnetic disk devices identical to the magnetic disk device used in the embodiment shown in FIG. 3 using a variable resistor 16. A driving circuit for a spindle motor and voice coil motor is included in an integrated circuit 18. This enables the desired power consumption to be easily attained through the use of the variable resistors 16.

Figure 6:
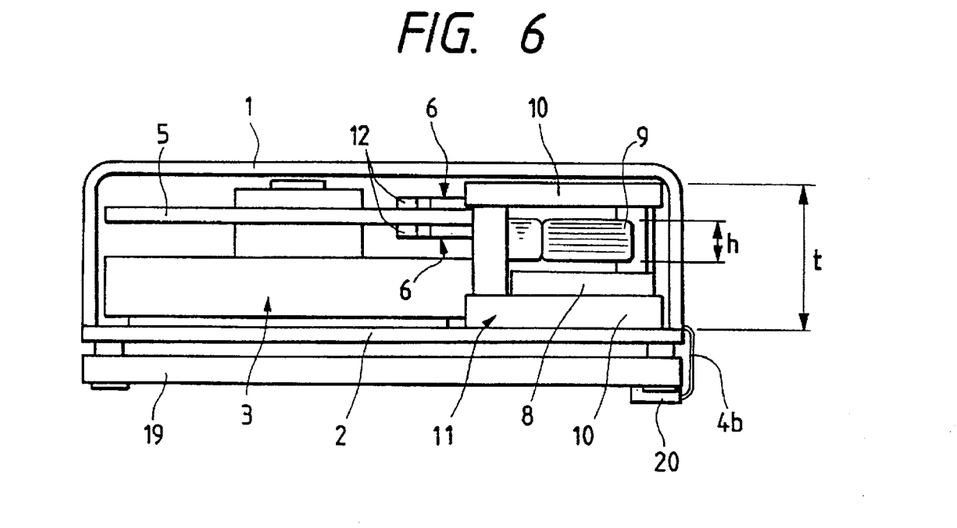
FIG. 6 is a side elevation view of another embodiment of the present invention using a thicker coil.

FIG. 6 shows another embodiment of the present invention. In this embodiment, a thicker coil 9 is used instead of the resistor 15. The thickness h of the coil 9 is about 1.6 and the combined resistance value is about 21.7Ω. When the thickness t of the magnetic circuit 11 is set to about 6.4 mm, just as in the embodiment of FIG. 1, it becomes necessary to make the magnet 8 and the yoke 10 thinner. When the power source voltage for driving the voice coil motor is 3.3 V, the power consumption of the voice coil motor can be 0.5 W. However, since the thicknesses of the magnet 8 and yoke 10 are smaller, the driving force of the voice coil becomes small. This results in the possibility that the moving speed of the magnetic head 12 will decrease. In spite of this, this method is effective when the reduction of power consumption is stressed, rather than the moving speed of the magnet head. Namely, when a ratio h/t of the thickness h of the coil 9 to the thickness t of the magnetic circuit 11 is 0.25, i.e., 1.6/6.4, or greater, then the reduction in power consumption is attained.

Figure 7:
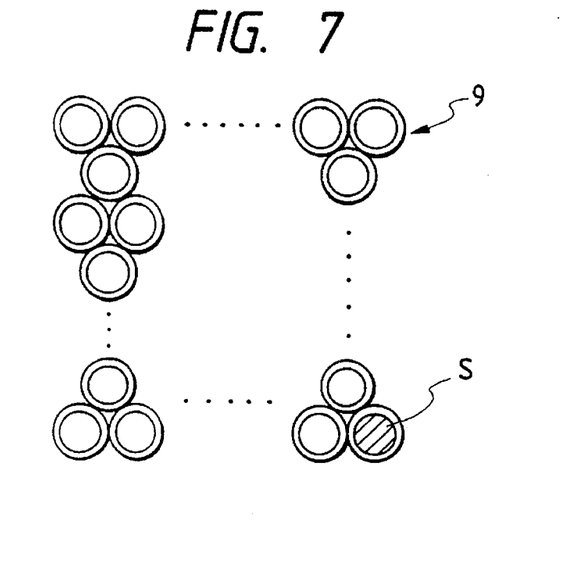
FIG. 7 is a sectional view of a coil in another embodiment of the present invention shown in FIG. 1.

FIG. 7 is a sectional view of a coil 9 of still another embodiment according to the present invention. In this embodiment, the coil 9, having a copper wire conductor portion with a diameter of 0.057 mm, is used instead of the resistor 15 in the embodiment of FIG. 1. In this example, the resistance value of the coil 9 is about 21.5Ω, and the power consumption of the voice coil motor is about 0.5 W. When the diameter of the conductor portion is smaller, the resistance value per unit length of the coil can be increased, and the number of turns thereof can be increased as well, so that the resistance value of the coil 9 becomes large. Namely, if a cross-sectional area S of the conductor portion is smaller than $2.55 \times 10^{-3}$ $(=(\pi/4) \times 0.057^2)$ mm², then the power consumption decreases. An array disk can also be formed by mounting a plurality of disk devices shown in these examples, on a substrate.

The above-described array can, of course, be correspondingly used with the type 2 and type 1 standards of the PCMCIA.

According to the present invention described above, the value of a current flowing in the coil of a voice coil motor in a miniature magnetic disk device or a miniature optical disk device is decreased so that a reduction in power consumption can be attained. Especially, the coil is preferably connected in series with a resistor having a large value in view of the moving speed of the magnetic heads and the manufacturing cost of the magnetic disk device.

Figure 9:
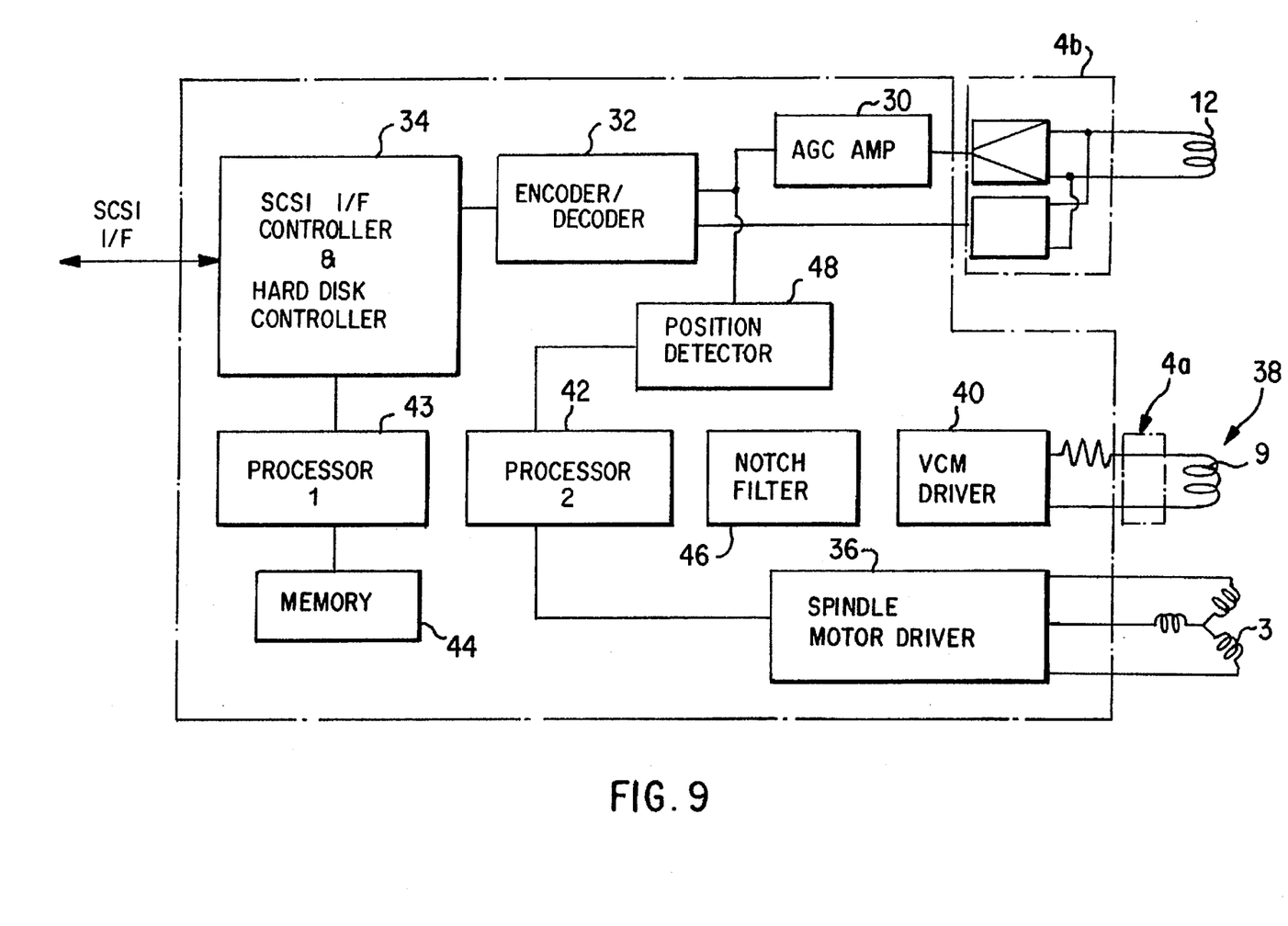
FIG. 9 is a schematic block diagram of a circuit according to the present invention.

FIG. 9 shows a functional schematic block diagram of the circuit of the present invention. Data, which is written over a track of a recording disk 5 (FIGS. 1–3) by the read/write head 12, is encoded in the form of digital signals. Data which is read by the read/write head 12 is provided to an equalizer and AGC circuit 30. The data is then converted to digital signals which are synchronized with a clock signal. The digital signals are decoded by a decoder circuit 32 and sent to an interface circuit 34 for a host computer (not shown). A spindle motor 3 is controlled to revolve at constant speed by a spindle motor driver circuit 36. A voice coil motor (VCM) 38 is controlled by a voice coil motor driver circuit 40, which receives its input via a notch filter 46 from a processor 42, to set the read/write head 12 at a center position of a desired track of the recording disk 5. This occurs in accordance with a feedback signal from a position detector 48 read from the recording disk 5. The voice coil motor 38 and the spindle motor 3 are controlled by the microprocessor 42 which includes an AD converter. The interface circuit 34 and the other functions of the miniature disk drive, except for the motors 3,38 are controlled by another microprocessor 43, having an associated memory 44.

The voice coil motor 38 includes a coil 9 which is coupled to the VCM driver circuit 40 through the FPC 4a. In accordance with the invention, a resistor 15 is connected in series with the coil 9 in order to reduce the current provided to the coil, and hence the power consumption. In accordance with other preferred embodiments, the resistor 15 could be a variable resistor to provide added flexibility.

Figure 10:
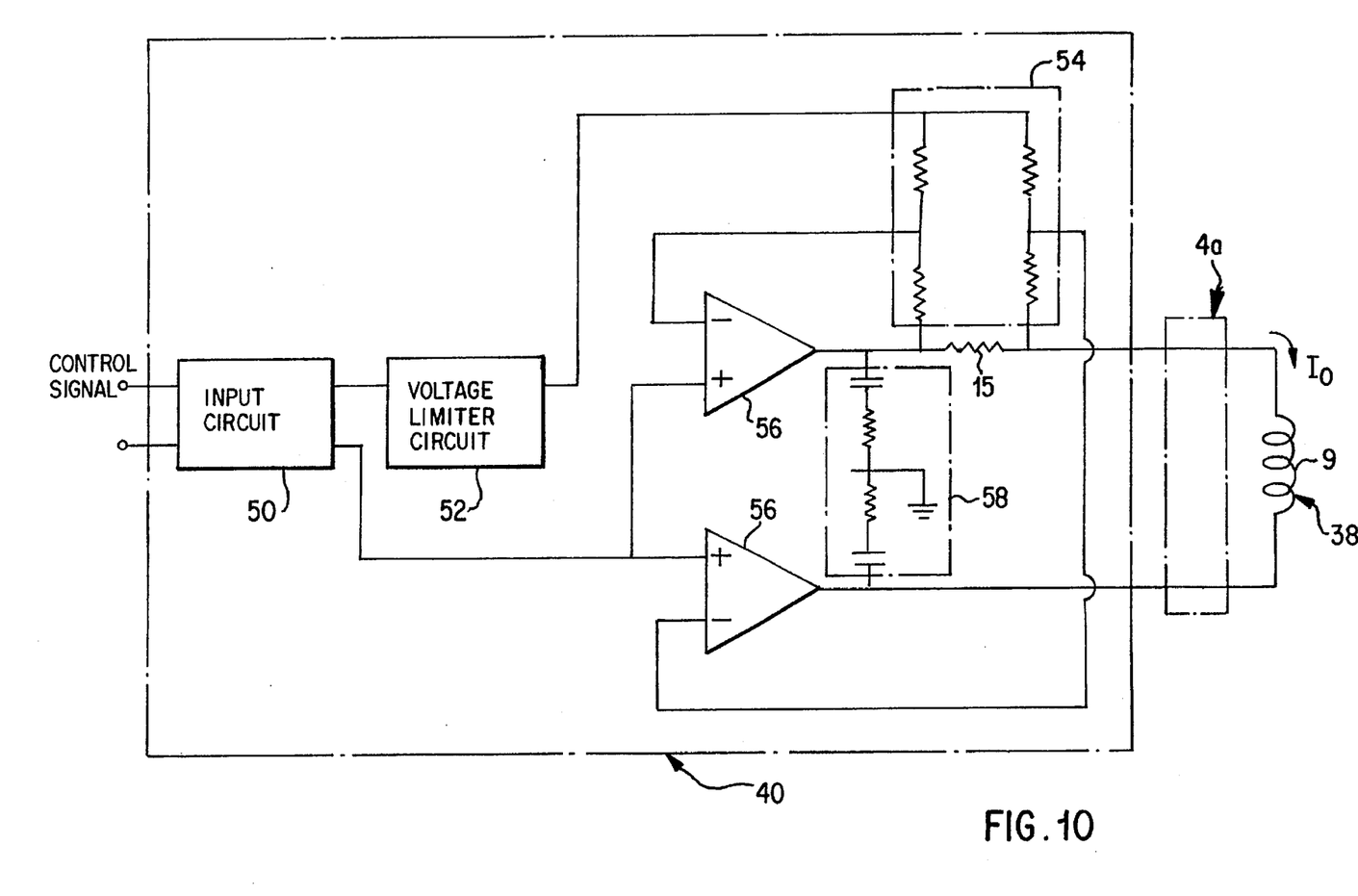
FIG. 10 is a detailed schematic diagram of a voice coil motor driver shown in FIG. 9.

A more detailed schematic diagram of the voice coil motor driver circuit 40 is shown in FIG. 10. In this figure, control signals for the voice coil motor 38 are input to the voice coil motor driver 40. These signals are amplified by an input circuit 50, processed through a voltage limiter circuit 52 and power amplifiers 56, and then applied to the voice coil motor 38. Gains of the power amplifiers 56 are adjusted via a gain adjustment circuit 54. The output of the power amplifiers 56 is stabilized by a stabilization circuit 58. A resistor 15 is coupled in series before the voice coil motor 38. The resistor 15 preferably has a value greater than or equal to 2.5Ω. Therefore, the current flow $I_0$ in the coil 9 of the voice coil motor 38 can be reduced to 0.15 A from 0.26 A for conventional 0.7 inch miniature disk devices without the resistor. Hence, the power consumption in the coil 9 can also be reduced to 0.5 W from a power level of 9.9 W for that of conventional 3.5 inch disk devices.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A miniature magnetic disk device, comprising:

at least one magnetic disk having a diameter;

a spindle motor having said at least one magnetic disk rotatable thereon;

at least one magnetic head arranged over said at least one magnetic disk for recording or reproducing information on or from said magnetic disk;

a support member, at least partially extending over said magnetic disk, and having said at least one magnetic head arranged at one end thereof so as to face said magnetic disk;

a support shaft coupled to another end of the support member such that the support member is movable over the magnetic disk;

a voice coil motor, including a coil, coupled to the support member and the support shaft for driving said support member to set the at least one magnetic head in a desired position over the magnetic disk;

a base mounting said support shaft and said spindle motor thereon;

a cover for housing said magnetic disk mounted on said spindle motor, said support member, said support shaft and said voice coil motor;

a control circuit board having a voice coil motor driving circuit for driving said voice coil motor and providing power to the coil;

a resistor connected in series with said coil;

wherein said resistor has a value correlated to the diameter of the magnetic disk in order to reduce the power consumption of the voice coil motor during operation of the disk device; and wherein the diameter of said magnetic disk is less than or equal to 0.7 inches and the value of said resistor is at least 2.5Ω.

2. A miniature magnetic disk device according to claim 1, wherein said resistor is a variable resistor.

3. A miniature magnetic disk device according to claim 1, wherein said voice coil motor further includes a magnetic circuit, and wherein a ratio h/t of a thickness h of the coil to a thickness t of the magnetic circuit is greater than or equal to 0.25.

4. A miniature magnetic disk device according to claim 1, wherein the coil is formed of a plurality of conductors, and wherein a cross-sectional area per conductor of said coil is less than or equal to $2.55 \times 10^{-3}$ mm$^2$.

5. A miniature magnetic disk device according to claim 1, further comprising a power source connected with said voice coil motor electrically, wherein voltage of said power source is less than or equal to 3.3 V.

6. A miniature magnetic disk device, comprising:

at least one information recording magnetic disk having a diameter;

at least one magnetic head for recording or reproducing information on or from said information recording magnetic disk;

a support member for holding said at least one magnetic head;

a support shaft coupled to said support member such that the support member is movable over the information recording magnetic disk;

a voice coil motor, including a coil, coupled to the support member and the support shaft for driving said support member to set the at least one magnetic head in a desired position over the information recording magnetic disk;

control circuit board having a voice coil motor driving circuit for driving said voice coil motor and providing power to the coil;

means for reducing power consumed by the voice coil motor, said power reducing means being correlated to the diameter of the magnetic disk in order to reduce the power consumption of the voice coil motor during operation of the disk device; and wherein the diameter of said magnetic disk is less than or equal to 0.7 inches.

7. A miniature magnetic disk device according to claim 6, said means for reducing power is a power source having a voltage less than or equal to 3.3 V.

8. A miniature magnetic disk device according to claim 6, wherein said voice coil motor further includes a magnetic circuit, and wherein a ratio h/t of a thickness h of the coil to a thickness t of said magnetic circuit is greater than or equal to 0.25.

9. A miniature magnetic disk device according to claim 6, wherein said coil is formed of a plurality of conductors, and wherein a cross-sectional area per conductor of said coil is less than or equal to $2.55 \times 10^{-3}$ mm$^2$.

10. A miniature magnetic disk device according to claim 6, wherein said voice coil motor driving circuit includes an input circuit for receiving control signals for positioning said recording head, a voltage limiting circuit coupled to the input circuit, and an amplification circuit coupled to the voltage limiting circuit, said amplification circuit supplying a current to said coil through said power reducing means.

11. A miniature magnetic disk device according to claim 10, wherein said voice coil motor driving circuit further comprises a stabilization circuit provided at the output of said amplification circuit, and a gain adjustment circuit provided as an input to said amplification circuit.

12. An array disk, comprising:

two or more miniature magnetic disk devices, each of which includes:

at least one magnetic disk having a diameter;

a spindle motor having said at least one magnetic disk rotatable thereon;

at least one magnetic head arranged over said at least one magnetic disk for recording or reproducing information on or from said magnetic disk;

a support member, at least partially extending over said magnetic disk, and having said at least one magnetic head arranged at one end thereof so as to face said magnetic disk;

a support shaft coupled to another end of the support member such that the support member is movable over the magnetic disk;

a voice coil motor, having a coil, coupled to the support member and the support shaft for driving said support member to set the at least one magnetic head in a desired position over the magnetic disk;

a base for mounting said support shaft and said spindle motor thereon;

a cover for housing said magnetic disk mounted on said spindle motor, said support member, said support shaft and said voice coil motor;

a control circuit board having a driving circuit for driving said spindle motor and said voice coil motor; and a resistor connected in series with said coil of said voice coil motor;

wherein said resistor has a value correlated to the diameter of the magnetic disk in order to reduce the power consumption of the voice coil motor during operation of the disk device; and wherein the diameter of said magnetic disk is less than or equal 0.7 inches and the value of said resistor is greater than-or equal to 2.5Ω.

13. A miniature optical disk device, comprising:

an information recording optical disk having a diameter;

at least one recording head for recording or reproducing information on or from said optical disk;

a support member for holding said at least one recording head;

a support shaft coupled to the support member such that the support member is movable over the optical disk;

a voice coil motor, having a coil, coupled to the support member and the support shaft for driving said support member to set the at least one recording head in a desired position over the optical disk;

control circuit board having a voice coil motor driving circuit for driving said voice coil motor and providing power to the coil;

a circuit for reducing power consumed by the voice coil motor, said circuit being correlated to the diameter of the optical disk in order to reduce the power consumption of the voice coil motor during operation of the disk device; and wherein the diameter of said optical disk is less than or equal to 0.7 inches.

14. A miniature optical disk device according to claim 13, wherein said circuit for reducing power includes a resistor connected in series with said coil and having a value of at least 2.5Ω.

15. A miniature optical disk device according to claim 14, wherein said resistor is a variable resistor.

16. A miniature optical disk device according to claim 13, wherein said circuit for reducing power includes a variable resistor connected in series with said coil and disposed on said control circuit board.

17. A miniature optical disk device according to claim 13, wherein said voice coil motor further includes a magnetic circuit, and wherein said circuit for reducing power is said coil having a ratio h/t of a thickness h of said coil to a thickness t of said magnetic circuit is greater than or equal to 0.25.

18. A miniature optical disk device according to claim 13, wherein said circuit for reducing power is said coil having a cross-sectional area per conductor of said coil being less than or equal to $2.55 \times 10^{-3}$ mm$^2$.

19. A miniature optical disk device according to claim 13, wherein said circuit for reducing power is a power source having voltage less than or equal to 3.3 V.

20. A miniature optical disk device according to claim 13, wherein said voice coil motor driving circuit includes an input circuit for receiving control signals for positioning said recording head, a voltage limiting circuit coupled to the input circuit, and an amplification circuit coupled to the voltage limiting circuit, said amplification circuit supplying a current to said coil through said circuit for reducing power.

21. A miniature optical disk device according to claim 20, wherein said voice coil motor driving circuit further comprises a stabilization circuit provided at the output of said amplification circuit, and a gain adjustment circuit provided as an input to said amplification circuit.

22. An array disk, comprising:

two or more miniature optical disk devices, each of which includes:

an information recording optical disk having a diameter;

at least one recording head for recording or reproducing information on or from said optical disk;

a support member, at least partially extending over said optical disk, and having said at least one recording head arranged at one end thereof so as to face said optical disk;

a support shaft coupled to another end of the support member such that the support member is movable over the optical disk;

a voice coil motor, having a coil, coupled to the support member and the support shaft for driving said support member to set the at least one recording head in a desired position over the optical disk;

a control circuit board having a driving circuit for driving said voice coil motor; and a resistor connected in series with said coil;

wherein said resistor has a value correlated to the diameter of the optical disk in order to reduce the power consumption of the voice coil motor during operation of the disk device; and wherein the diameter of said optical disk is less than or equal to 0.7 inches and the value of said resistor is greater than or equal to 2.5Ω.

* * * * *